United States Patent
Sadek et al.

(10) Patent No.: US 12,515,403 B1
(45) Date of Patent: Jan. 6, 2026

(54) MULTIFUNCTIONAL DEPOSITION NOZZLE FOR ADDITIVE MANUFACTURING

(71) Applicant: ATLANT 3D , ApS, Taastrup (DK)

(72) Inventors: Samir Hassan Mahmoud Ahmed Sadek, Taastrup (DK); Mira Baraket, Albertslund (DK); Maksym Plakhotnyuk, Kongens Lyngby (DK)

(73) Assignee: ATLANT 3D, ApS, Taastrup (DK)

( * ) Notice: Subject to any disclaimer, the term of this patent is extended or adjusted under 35 U.S.C. 154(b) by 0 days.

(21) Appl. No.: 18/997,487

(22) PCT Filed: Oct. 16, 2024

(86) PCT No.: PCT/US2024/051583
§ 371 (c)(1),
(2) Date: Jan. 21, 2025

(51) Int. Cl.
| | |
|---|---|
| *B29C 64/159* | (2017.01) |
| *B29C 64/209* | (2017.01) |
| *B29C 64/25* | (2017.01) |
| *B29C 64/371* | (2017.01) |
| *B33Y 40/10* | (2020.01) |
| *C23C 16/44* | (2006.01) |
| *C23C 16/455* | (2006.01) |
| *B33Y 10/00* | (2015.01) |
| *B33Y 30/00* | (2015.01) |

(52) U.S. Cl.
CPC ........ *B29C 64/209* (2017.08); *C23C 16/4418* (2013.01); *C23C 16/45525* (2013.01); *C23C 16/45563* (2013.01); *B33Y 10/00* (2014.12); *B33Y 30/00* (2014.12)

(58) Field of Classification Search
CPC ..... B29C 64/159; B29C 64/209; B29C 64/25; B29C 64/371; B33Y 10/00; B33Y 30/00; B33Y 40/10; C23C 16/4418; C23C 16/45525; C23C 16/45563
USPC ................. 264/81, 85, 129, 308; 425/375; 427/255.28; 118/715
See application file for complete search history.

(56) References Cited

U.S. PATENT DOCUMENTS

| | | |
|---|---|---|
| 2015/0194604 A1 | 7/2015 | Jang et al. |
| 2019/0001412 A1 | 1/2019 | Gibson et al. |
| 2020/0368848 A1 | 11/2020 | Birmingham |
| 2022/0298630 A1 | 9/2022 | Jun et al. |
| 2022/0307133 A1 | 9/2022 | Plakhotnyuk et al. |

*Primary Examiner* — Leo B Tentoni
(74) *Attorney, Agent, or Firm* — Guy Levi; The IP Law Firm of Guy Levi, LLC

(57) ABSTRACT

The disclosure relates to devices, systems and methods for forming multi-layer films. Specifically, the disclosure relates to devices, systems and methods for forming multi-layered film using a multifunctional nozzle, enabling materials deposition using Atomic Layer Deposition (ALD), Chemical Vapor Deposition (CVD), and Sequential Infiltration Synthesis (SIS), all within the same system.

24 Claims, 5 Drawing Sheets

MULTIFUNCTIONAL DEPOSITION NOZZLE FOR ADDITIVE MANUFACTURING

CROSS REFERENCE TO RELATED APPLICATIONS

This patent application is a U.S. National Phase filing of commonly owned and pending PCT Application No. PCT/US24/51583, filed Oct. 16, 2024, incorporated herein by reference in its entirety.

BACKGROUND

The disclosure is directed to devices, systems and methods for forming multi-layer films. Specifically, the disclosure is directed to devices, systems and methods for forming multi-layered film using a multifunctional nozzle, enabling materials deposition using Atomic Layer Deposition (ALD), Chemical Vapor Deposition (CVD), and Sequential Infiltration Synthesis (SIS), all within the same system.

Typically, nozzles used in ALD are carefully chosen for their ability to withstand the harsh operating chemical environment. Common materials include quartz, alumina, glass, and stainless steel, for their chemical resistance. Other materials can be used that are polymer-based. Design is a key consideration in ALD nozzle selection. These nozzles are oftentimes cylindrical or needle-like in shape, allowing for precise delivery of the precursor gases to the substrate surface. The designs ensure controlled and uniform flow of reactants, beneficial for achieving consistent deposition results (in terms of voxel resolution).

Furthermore, while there are similarities between CVD and ALD nozzles in terms of material and design considerations, CVD nozzles typically have larger diameters, emphasize uniform gas distribution, and cater to continuous gas flow requirements at higher flowrates, while additionally accommodating a broader range of precursor chemistries.

Likewise, while SIS nozzles share some similarities with ALD and CVD nozzles in terms of material selection, design considerations, and temperature control, they do differ in terms of diameter, gas distribution requirements, and the emphasis on sequential precursor delivery. SIS nozzles are tailored to enable precise, controlled, and sequential infiltration processes, catering to the specific requirements of the SIS technique.

In addition, achieving uniform gas flow and deposition across the entire desired substrate surface can be challenging. Variations in nozzle design, gas diffusion behavior, partial concentration of the gas in the pipe, or gas distribution across the substrate can result in uneven deposition, leading to thickness variations or other film quality issues, resulting in inconsistent performance of the final product. Achieving high uniformity is an important factor for many ALD, CVD, or SIS applications.

Other issues associated with nozzle design for all of ALD, CVD, and SIS are, for example; precursor waste (reducing process efficiency and increasing costs), scalability (the scale-up from benchtop to commercial applications), compatibility (with various precursor/reactant chemistries, to prevent corrosion or degradation, ensuring long-term reliability), and cost (commercially feasible).

To provide versatility, and cost effectiveness, there is therefore a need for a single system for enabling the formation of multi-layered films using ALD, CVD, and SIS.

SUMMARY

Disclosed, in various exemplary implementations, are devices, systems and methods for forming multi-layered film using a multifunctional (multi-purpose) nozzle, enabling materials deposition using Atomic Layer Deposition (ALD), Chemical Vapor Deposition (CVD), and Sequential Infiltration Synthesis (SIS), all within the same system.

In an exemplary implementation provided herein is a multifunctional nozzle operable for Atomic Layer Deposition (ALD), Chemical Vapor Deposition (CVD), and Sequential Infiltration Synthesis (SIS), the nozzle comprising: an upper housing portion having an apical side and a basal side; a lower housing portion, extending basally from basal side of the upper portion, the lower housing portion having a basal surface, wherein the basal portion defining a peripheral wall having a predetermined perimeter cross section extending basally beyond the basal surface; a precursor inlet port, the precursor inlet port being in fluid communication with: a precursor reservoir containing a precursor; and the basal surface of the lower housing portion; a first exhaust port, or a first vacuum port, the first vacuum port being in fluid communication with: a first vacuum source; and the basal surface of the lower housing portion a reactant inlet port, the reactant inlet port being in fluid communication with: a reactant reservoir containing a reactant; and the basal surface of the lower housing portion; a second exhaust port, or a second vacuum port, the second vacuum port being in fluid communication with: a second vacuum source; and the basal surface of the lower housing portion; and an inert gas inlet port, the inert gas inlet port being in fluid communication with: a precursor reservoir; and the basal surface of the lower housing portion.

In another exemplary implementation, provided herein is a method of performing a multi-layered material using ALD, or SIS, implemented using the multi-purpose nozzles disclosed herein, the method comprising: Coupling the nozzle to a substrate forming a sealed reaction chamber; Using the precursor port, contacting the reaction chamber with the precursor in a gaseous state for a predetermined period, wherein the precursor is configured to adhere to the substrate, forming a first precursor layer; Using the inert gas port, flushing the reaction chamber; Using the first exhaust port, or the first vacuum port, purging the reaction chamber from excess precursor; Using the reactant port, contacting the reaction chamber with the reactant in a gaseous state for a predetermined period, wherein the reactant is configured to react with the first precursor layer, forming a first reaction layer; Using the inert gas port, flushing the reaction chamber; Using the second exhaust port, or the second vacuum port, purging the reaction chamber from excess reactant; optionally repeating the steps from the step of contacting the reaction chamber with the precursor, to the step of purging the reaction chamber from excess reactant; and decoupling the substrate from the nozzle.

In yet another exemplary implementation, provided herein is a method of performing a multi-layered material using CVD, implemented using the multi-purpose nozzles disclosed herein, the method comprising: Coupling the nozzle to a substrate forming a sealed reaction chamber; Using the precursor port, contacting the reaction chamber with the precursor in a gaseous state for a predetermined period, wherein the precursor is configured to adhere to the substrate, forming a first precursor layer; Using the reactant port, simultaneously with the step of contacting the reaction chamber with the precursor, contacting the reaction chamber with the reactant in a gaseous state for the same predetermined period, wherein the reactant is configured to react with the first precursor layer, forming a first reaction layer; Using the inert gas port, flushing the reaction chamber;

Using the first exhaust port, or the first vacuum port, purging the reaction chamber from excess precursor; Using the second exhaust port, or the second vacuum port, simultaneously with the step of purging the reaction chamber from excess precursor-purging the reaction chamber from excess reactant; optionally repeating the steps from the step of contacting the reaction chamber with the precursor, to the step of purging the reaction chamber from excess reactant; and decoupling the substrate from the nozzle.

These and other features of the systems and methods for forming multi-layered film using a multifunctional (multi-purpose) nozzle, enabling materials deposition using ALD, CVD, and SIS, will become apparent from the following detailed description when read in conjunction with the figures and examples, which are exemplary, not limiting.

BRIEF DESCRIPTION OF THE FIGURES

For a better understanding of the devices, systems and methods for forming multi-layered film using a multifunctional (multi-purpose) nozzle, enabling materials deposition using ALD, CVD, and SIS, with regard to the exemplary implementations thereof, reference is made to the accompanying examples and figures, in which.

DETAILED DESCRIPTION

Provided herein are exemplary implementations of devices, systems and methods for forming multi-layered film using a multifunctional (multi-purpose) nozzle, enabling materials deposition using Atomic Layer Deposition (ALD), Chemical Vapor Deposition (CVD), and Sequential Infiltration Synthesis (SIS), all within the same system.

Figure 6:
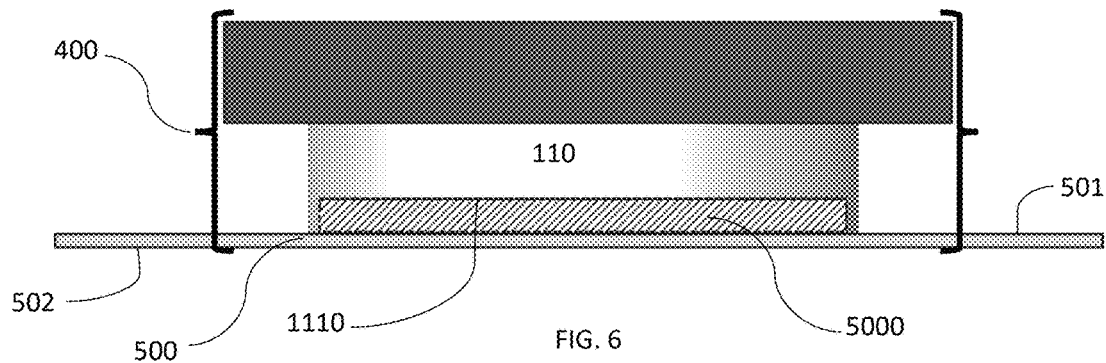
FIG. 6, is a schematic illustration of the nozzle coupled to a substrate.

Atomic Layer Deposition (ALD) refers to a precise thin film deposition technique enabling the growth of uniform and conformal films at the atomic scale. Using ALD film growth is done in a controlled, layer-by-layer fashion beginning with a substrate surface (see e.g., 501, FIG. 6) that is chemically prepared, typically cleaned to remove any contaminants or oxides. The deposition starts with an initial reactant, called the precursor, being introduced into the reaction chamber (see e.g., 5000, FIG. 6). The precursor is selected based on the desired film composition and properties. It is typically a vapor or gas-phase fluid that can react with, or preferentially adhere to the substrate surface. To achieve atomic-level control, the precursor is introduced into the chamber in a controlled pulse or brief exposure. The pulses of precursor are precisely timed and controlled to ensure they interact with the substrate surface for a defined period. During this exposure, a self-limiting reaction occurs (meaning that it stops once a full monolayer is formed) at the surface, resulting in the formation of a monolayer or sub-monolayer of the desired material. Excess precursor, unreacted byproducts, and any adsorbed impurities are then purged from the chamber using an inert gas such as nitrogen or argon. The cycle is then repeated, alternating between precursor exposure and purge steps, gradually building up the film layer by layer. The number of cycles is carefully controlled to achieve the desired film thickness, which can range from a few nanometers to several micrometers. Success of ALD will hinge on the ability to precisely control the number of atomic layers deposited during each cycle. This control is achieved by accurately controlling the precursor pulse time, temperature, pressure, and other process parameters. The layer-by-layer growth of ALD ensures uniformity, even on complex 3D structures such as trenches, pores, or high aspect ratio ($>>1$) features. The resulting films can be configured to exhibit uniform thickness and excellent control over composition and properties, important in various fields, including semiconductor manufacturing, energy storage, catalysis, optics, and surface engineering.

Additionally, or alternatively, Chemical Vapor Deposition (CVD) refers to a technique in which thin films are deposited on a substrate through the chemical reaction of vapor-phase precursors. In CVD, the process begins with a substrate, typically made of silicon, metal, or glass, (e.g., a wafer), in contact with a reaction chamber (see e.g., 5000, FIG. 6). The chamber is then filled with a carrier gas, often an inert gas like nitrogen or argon, to provide a controlled environment. Next, precursor gases containing the desired elements or compounds required for film formation are introduced into the chamber. These precursor gases are chosen based on the desired film composition and properties. They can be in liquid or vapor form. The precursor gases are carried by the carrier gas and flow over the optionally heated substrate. As the gases come into contact with the heated substrate surface, they undergo chemical reactions. These reactions lead to the decomposition or reaction of the precursor molecules, resulting precipitation from the vapor or gas phases and the deposition of solid material on the substrate. The reactions occurring at the substrate surface can involve a range of processes such as thermal decomposition, pyrolysis, or even plasma-enhanced reactions. The precise conditions, including temperature, pressure, and gas flow rates, are carefully controlled to drive the desired chemical reactions and deposition. During the reaction, the deposited material forms a thin film on the substrate surface. The film grows continuously as more precursor gases are introduced and react at the surface. The growth can be controlled, for example, by adjusting the deposition time or by varying the precursor flow rates.

A salient aspect of CVD is that the film growth occurs not only on the substrate surface, but also on any available surfaces within the reaction chamber. This includes the walls and other fixtures. To prevent unwanted film deposition in these areas, and in an exemplary implementation, deposition techniques such as hot-wall or cold-wall configurations are employed.

Sequential Infiltration Synthesis (SIS) refers to a unique thin film deposition technique that enables the controlled growth of films inside nanoporous materials or nanostructured substrates. In SIS, the process begins with a nanoporous material or a nanostructured substrate, such as a template or self-assembled monolayers (e.g., such as those created by ALD), being prepared. These substrates possess intricate pore structures or surfaces modified with chemically reactive groups. The SIS process involves the sequential introduction of precursor molecules into the nanopores or onto the modified surfaces. The precursors are delivered in gas form, from liquid, gas or solid-based precursors depending on the specific application. These precursors are selected based on the desired film composition and properties. The chamber is filled with a carrier gas, often an inert gas, which helps transport the precursor molecules into the nanopores or onto the modified surfaces in a self-limiting manner. The precursor molecules are exposed to the substrate in a controlled manner. The exposure time is carefully controlled to ensure only a fraction of the precursor molecules infiltrate into the nanopores. During the exposure, the precursor molecules chemically react or adsorb with the surface or functional groups within the nanopores or deposited films. These reactions are typically designed to deposit a thin layer of material, growing the film layer by layer. following the exposure to the precursor, excess or unreacted molecules are purged or rinsed from the system, typically using an inert gas or a solvent. This step helps remove any non-desirable residues or excess precursor, leaving the desired material encapsulated within the nanoporous structure, or adsorbed onto the deposited film. The cycle of precursor exposure and purging is repeated, with each cycle leading to the growth of a thin layer of material on the substrate. The number of cycles determines the final film thickness, allowing precise control over the film's nanostructure.

SIS enables the deposition of various materials, including metals, metal oxides, polymers, and organic-inorganic hybrids. The resulting films exhibit excellent uniformity, conforming to the intricate nanoporous structure or nanostructured substrate, leading to unique properties and functionalities.

SIS finds applications in fields such as nanoelectronics, energy storage, catalysis, and sensor devices. The ability to precisely engineer the nanoscale films within complex nanostructures opens up opportunities for creating advanced materials with enhanced performance and tailored properties.

Definitions

In the context of the disclosure, the term "operable" means the system and/or the device and/or the program, or a certain element or step is fully functional, sized, adapted, and calibrated, comprises elements for, and meets applicable operability requirements to perform a recited function when activated, coupled, implemented, actuated, effected, realized, or when an executable program is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

The term "fluid communication" or "liquid communication" refers to any area, a structure, or communication that allows for fluid communication between at least two fluid retaining regions, for example, a tube, duct, conduit or the like connecting two regions. One or more fluid communication can be configured or adapted to provide for example, vacuum driven flow, electrokinetic driven flow, control the rate and timing of fluid flow by varying the dimensions of the fluid communication passageway, rate of circulation or a combination comprising one or more of the foregoing. Alternatively, and in another exemplary implementation, the term "in communication" can also refer to gaseous and/or vapor communication, i.e. that gas and/or vapor may be transferred from one volume to another volume since these volumes are in communication. This term does not exclude the presence of a gas shutter or valve between the volumes that may be used to interrupt the gas communication between the volumes.

The term "engage" and various forms thereof, when used with reference to retention of a member (e.g., the detent), refer to the application of any forces that tend to hold two components together against inadvertent or undesired separating forces (e.g., such as may be introduced during use of either component). It is to be understood, however, that engagement does not in all cases require an interlocking connection that is maintained against every conceivable type or magnitude of separating force. Also, "engaging element" or "engaging member" refers to one or a plurality of coupled components, at least one of which is configured for releasable engagement.

In the context of the disclosure, the term "accommodate" refers to the ability of an accommodating element (e.g., the peripheral channel) to allow passage or retention of another element (e.g., the O-ring) at close tolerance, without substantial space for other elements or components.

The terms "first." "second," and the like, when used herein do not denote any order, quantity, or importance, but rather are used to denote one element from another. The terms "a", "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the duct(s) includes one or more ducts). Reference throughout the specification to "one exemplary implementation", "another exemplary implementation", "an exemplary implementation", and so forth, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

In addition, for the purposes of the present disclosure, directional or positional terms such as "top", "apical", "basal", "proximal", "distal", "bottom", "upper," "lower," "side," "front," "frontal," "forward," "rear," "rearward," "back," "trailing," "above," "below," "left," "right," "radial," "vertical," "upward," "downward," "outer," "inner," "exterior," "interior," "intermediate," etc., are merely used for convenience in describing the various exemplary implementations of the present disclosure.

The term "coupled", including its various forms such as "operably coupled", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process (e.g., an electromagnetic field). Indirect coupling may involve coupling through an intermediary member or adhesive, or abutting and otherwise resting against, whether frictionally (e.g., against a wall) or by separate means without any physical connection.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. Furthermore, the terms "first," "second," and the like, herein do not denote any order, quantity, or importance, but rather are used to denote one element from another.

Likewise, the term "about" means that amounts, ranges, sizes, formulations, parameters, and other quantities and characteristics are not and do not need be exact, but may be approximate and/or larger or smaller, as desired, reflecting tolerances, conversion factors, rounding off, measurement error and the like, and other factors known to those of skill in the art. In general, an amount, ranges, size, formulation, parameter or other quantity or characteristic is "about" or "approximate" whether or not expressly stated to be such and is intended to include the degree of error associated with measurement of the particular quantity based upon the equipment available at the time of filing the application. For example, "about" can include a range of +/−15% or 10%, or 5% of a given value.

A more complete understanding of the components, processes, assemblies, and devices disclosed herein can be obtained by reference to the accompanying drawings. These figures (also referred to herein as "FIG.") are merely schematic representations (e.g., illustrations) based on convenience and the ease of demonstrating the present disclosure, and are, therefore, not intended to indicate relative size and dimensions of the devices or components thereof and/or to define or limit the scope of the exemplary implementations. Although specific terms are used in the following description for the sake of clarity, these terms are intended to refer only to the particular structure of the exemplary implementations selected for illustration in the drawings and are not intended to define or limit the scope of the disclosure. In the drawings and the following description below, it is to be understood that like numeric designations refer to components of like function.

Figure 7A:
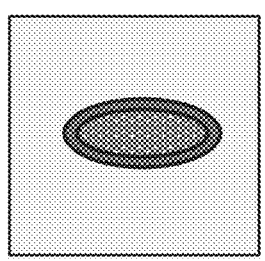
FIG. 7A-7C, illustrate exemplary implementations of the predetermined perimeter cross section in the peripheral wall of the lower housing portion of the multi-purpose nozzle.
Figure 7B:
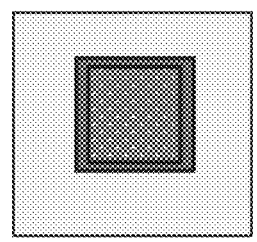
Figure 7C:
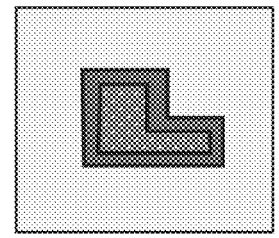

Turning to FIGS. 1-3B, and in an exemplary implementation, provided herein is multifunctional nozzle 10 operable for Atomic Layer Deposition (ALD), Chemical Vapor Deposition (CVD), and Sequential Infiltration Synthesis (SIS), multi-purpose nozzle 10 comprising: upper housing portion 100 having apical side 101 and basal side 102; lower housing portion 110, extending basally from basal side 102 of upper portion 100, lower housing portion 110 having basal surface 1110, wherein basal lower housing potion 110 defining peripheral wall 120 having predetermined perimeter cross section (See e.g., FIGS. 7A-7C) extending basally beyond basal surface 1110; precursor inlet port 201, precursor inlet port being in liquid communication with: precursor reservoir (P1, see e.g., FIG. 4) containing precursor; and basal surface 1110 of lower housing portion 110; first exhaust port, or first vacuum port 202, first vacuum port 202 being in liquid communication with: first vacuum source (not shown, e.g, a vacuum pump); and basal surface 1110 of lower housing portion 110; reactant inlet port 203, reactant inlet port 203 being in liquid communication with: reactant reservoir (R1, see e.g., FIG. 4), containing reactant; and basal surface 1110 of lower housing portion 110; second exhaust port, or second vacuum port 204, second vacuum port 204 being in liquid communication with: second vacuum source (not shown, e.g, a vacuum pump); and basal surface 1110 of lower housing portion 110; and inert gas inlet port 205, inert gas inlet port 205 being in liquid communication with: inert gas reservoir (see e.g., FIG. 4); and basal surface 1110 of lower housing portion 110.

As further illustrated, peripheral wall 120 further comprises internal lip 112, and external lip 111, forming channel 113 in-between, channel sized and adapted to accommodate optional O-ring 700 (not shown). As further illustrated in FIGS. 1-3B, multi-purpose nozzle 10, further comprises third vacuum port 210, third vacuum port 210 being in liquid communication with: third vacuum source (not shown, e.g, a vacuum pump); and channel 113 formed in-between internal lip 112 and external lip 111, channel 113 operable to engage a substrate.

Figure 2:
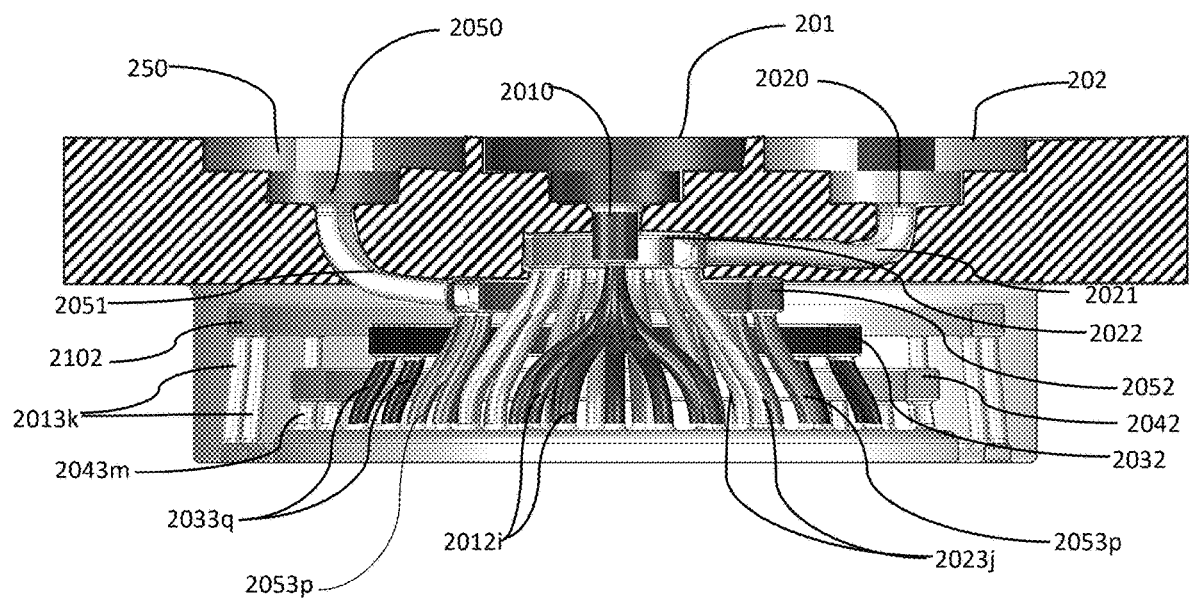
FIG. 2, illustrates a X-Z cross section C-C of the exemplary implementation illustrated in FIG. 1.
Figure 3A:
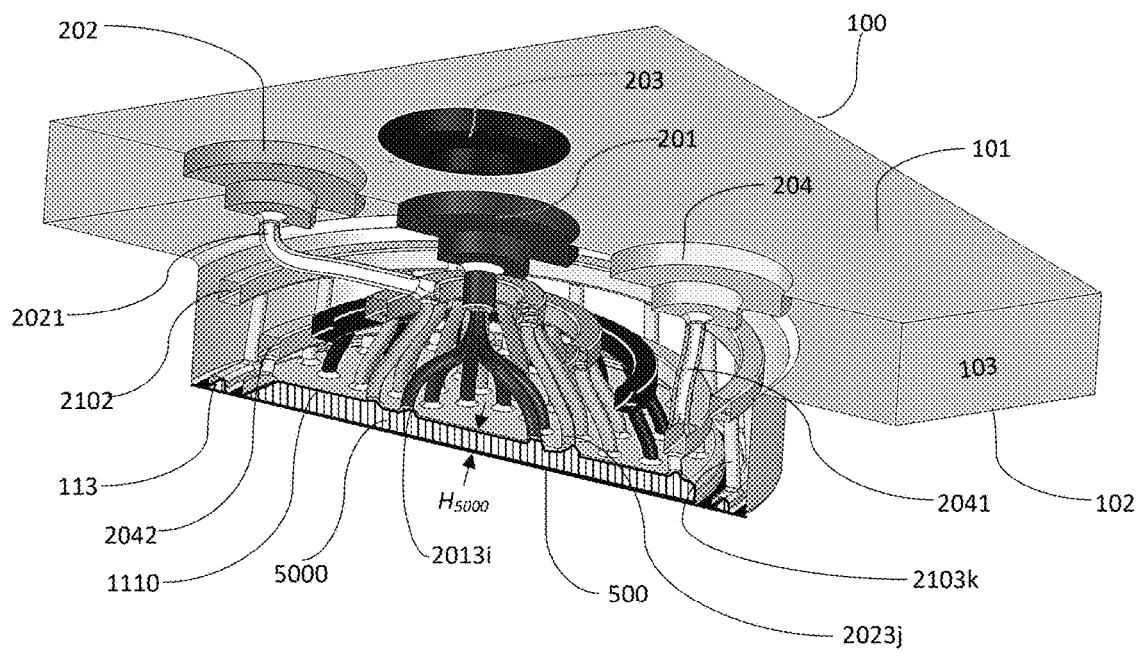
FIG. 3A, illustrates a X-Z cross section A-A of the exemplary implementation illustrated in FIG. 1, with FIG. 3B illustrating a X-Z cross section B-B of the exemplary implementation illustrated in FIG. 1.
Figure 3B:
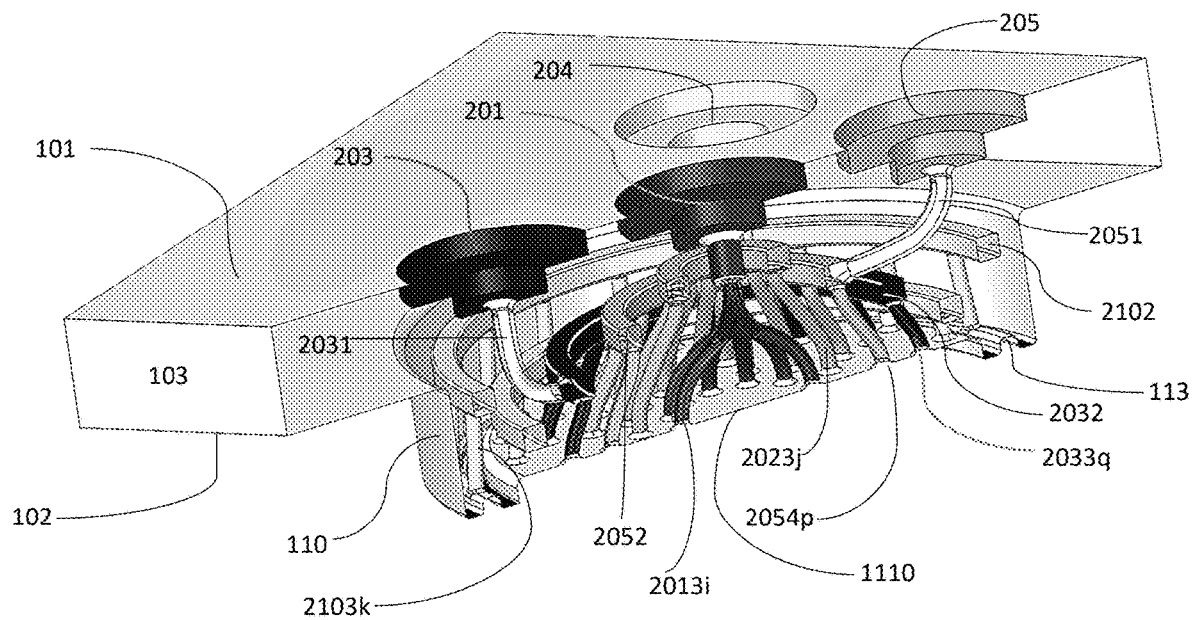

Turning now to FIGS. 2-3B, precursor inlet port 201 defining basal aperture 2010 is in communication with basal surface 1110 of lower housing portion 110 via plurality of ducts 2012$i$, branching basally (e.g., a showerhead) from aperture 2010 defined in precursor inlet port 201, each $i^{th}$ duct 2012$i$ terminating in corresponding precursor outlet opening 2013$i$—defined in basal surface 1110 of lower housing portion 110.

Figure 1A:
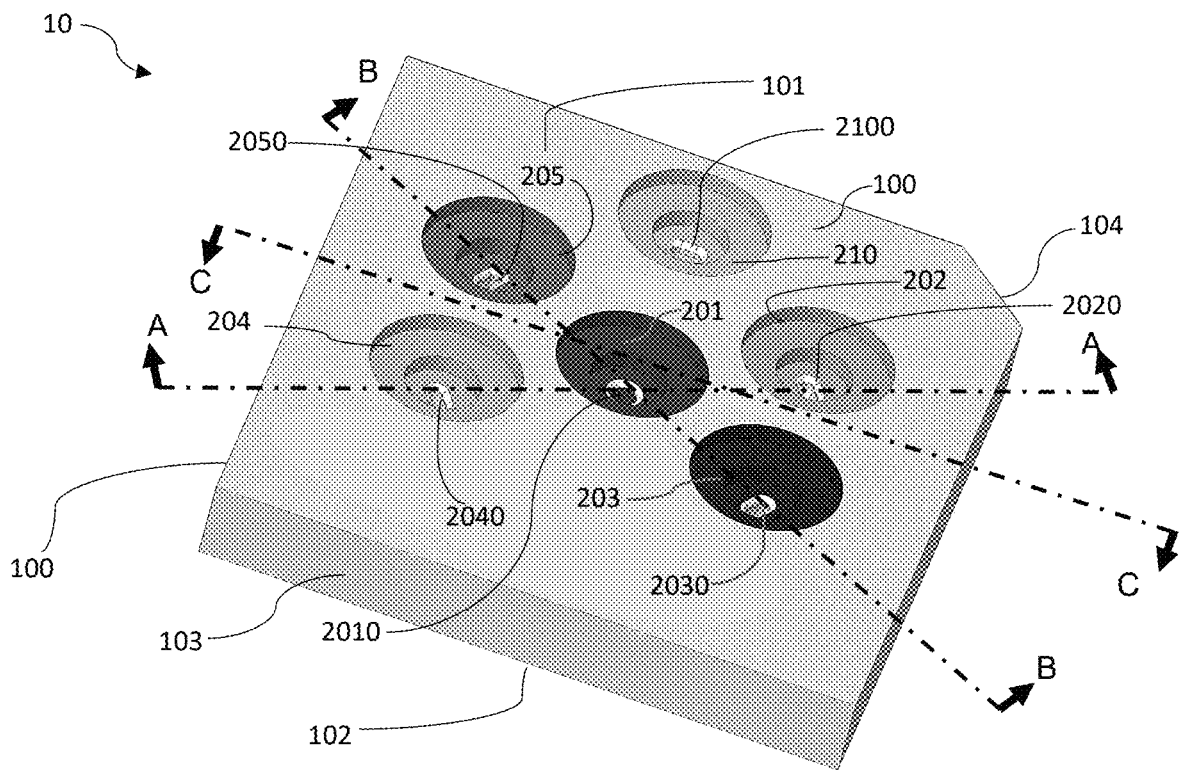
FIG. 1A illustrates a top perspective view of the multifunctional (interchangeable with multi-purpose) nozzle, with FIG. 1B, illustrating a bottom perspective thereof.
Figure 1B:
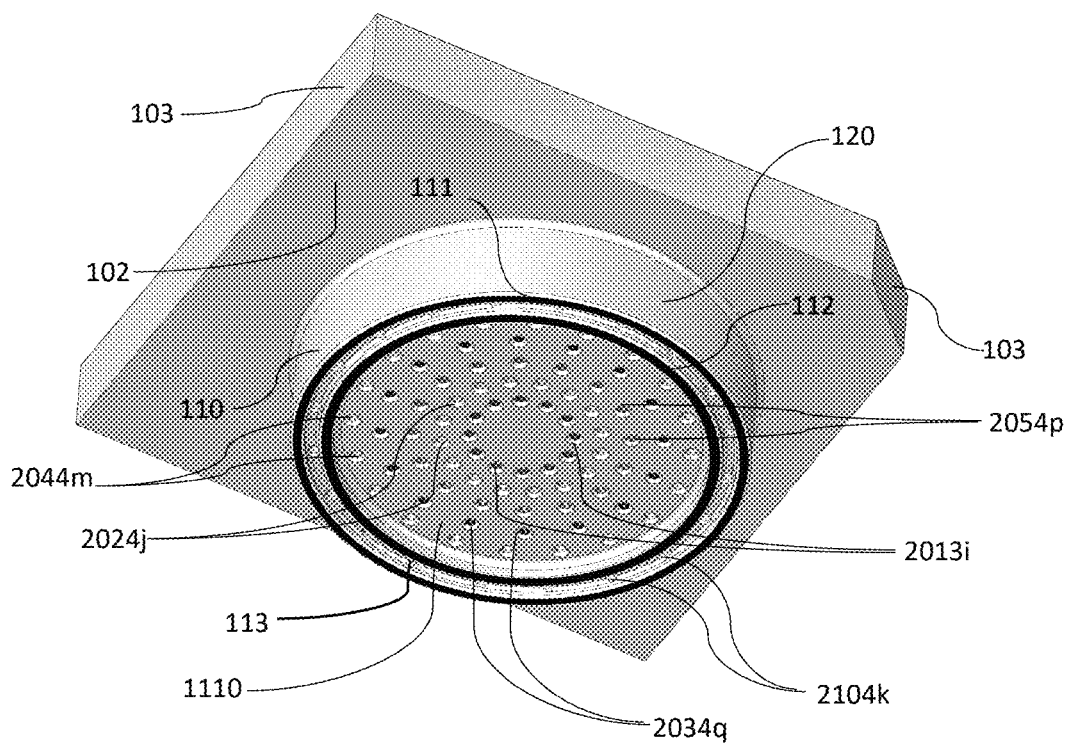

Furthermore, first exhaust port, or first vacuum port 202 is in fluid communication with basal surface 1110 of lower housing portion 110 via: first exhaust tube, or first vacuum tube 2021 extending basally from aperture 2020 defined in first exhaust port, or first vacuum port 202; first annular manifold 2022, in fluid communication with first exhaust tube, or first vacuum tube 2021; and plurality of ducts 2023$j$ extending basally from first annular manifold 2022, each $j^{th}$ duct of plurality of ducts 2023$j$ terminating in a corresponding opening 2024$j$—defined in the basal surface 1110 of the lower housing portion 110. In an exemplary implementation, first exhaust tube, or first vacuum tube 2021 defines an ovoid cross section having a major axis that is tangential to first annular manifold 2022. Additionally, as illustrated in FIGS. 2, and 3B, reactant port 203 is in fluid communication with basal surface 1110 of lower housing portion 110 via: reactant tube 2031 extending basally from aperture 2030 defined in reactant port 203; reactant annular manifold 2032, being in fluid communication with reactant tube 2032; and plurality of ducts 2033$q$ extending basally from reactant annular manifold 2032, each $q^{th}$ duct of plurality of ducts 2033$q$ terminating in corresponding opening—2034$q$ defined in basal surface 1110 of the lower housing portion 110. Likewise, as illustrated in FIGS. 2, and 3A the second exhaust port, or second vacuum port 204 is in fluid communication with basal surface 1110 of lower housing portion 110 via: second exhaust tube, or second vacuum tube 2041 extending basally from aperture 2040 defined in second exhaust port, or second vacuum port 204; second annular manifold 2042, being in fluid communication with second exhaust tube, or second vacuum tube 2041; and plurality of ducts 2043$m$ extending basally from second annular manifold 2042, each m' duct of plurality of ducts 2043$m$ terminating in corresponding opening 2044$m$—defined in basal surface 1110 of lower housing portion 110. Moreover, as illustrated in FIGS. 1, 2, and 3B, inert gas port 205 is in fluid communication with basal surface 1110 of lower housing portion 110 via: inert gas tube 2051 extending basally from aperture 2050 defined in inert gas port 205; inert gas annular manifold 2052, in fluid communication with inert gas tube 2051; and plurality of ducts 2053p extending basally from inert gas annular manifold 2052, each p$^{th}$ duct of plurality of ducts 2053p terminating in corresponding opening 2054p—defined in basal surface 1110 of lower housing portion 110.

As illustrated in FIG. 2, and in an exemplary implementation, the aperture 2010 defined in precursor inlet port 201, first annular manifold 2022, reactant annular manifold 2032, second annular manifold 2042, and inert gas manifold 2052 are co-axial, with aperture 2010 defined in precursor inlet port 201 being in the center. In another exemplary implementation, third annular manifold 2102 is also co-axial with aperture 2010 defined in precursor inlet port 201. Accordingly and in yet another exemplary implementation, as illustrated in FIGS. 2, and 3B, third vacuum port 210 is in liquid communication with channel 113 formed in-between internal lip 112 and external lip 111 via: third vacuum tube 2101 extending basally from aperture 2100 defined in third vacuum port 210; third annular manifold 2102, in liquid communication with third vacuum tube 2101; and plurality of ducts 2103k extending basally from third annular manifold 2102, each k$^{th}$ duct of plurality of ducts 2103k terminating in corresponding opening 2104k—defined apically in channel 113 formed in-between internal lip 112 and external lip 111.

Turning back to FIG. 2, as illustrated, first annular port aperture is defined in upper housing portion 100 of multifunctional nozzle 10, while reactant annular manifold 2032, second annular manifold 2042, and inert gas manifold 2052 are each defined in lower housing portion 110. Additionally, and in another exemplary implementation illustrated in FIGS. 2-3B, aperture 2010 defined in precursor inlet port 201, first annular manifold 2022, reactant annular manifold 2032, second annular manifold 2042, and inert gas manifold 2052 are axially separated.

Figure 4:
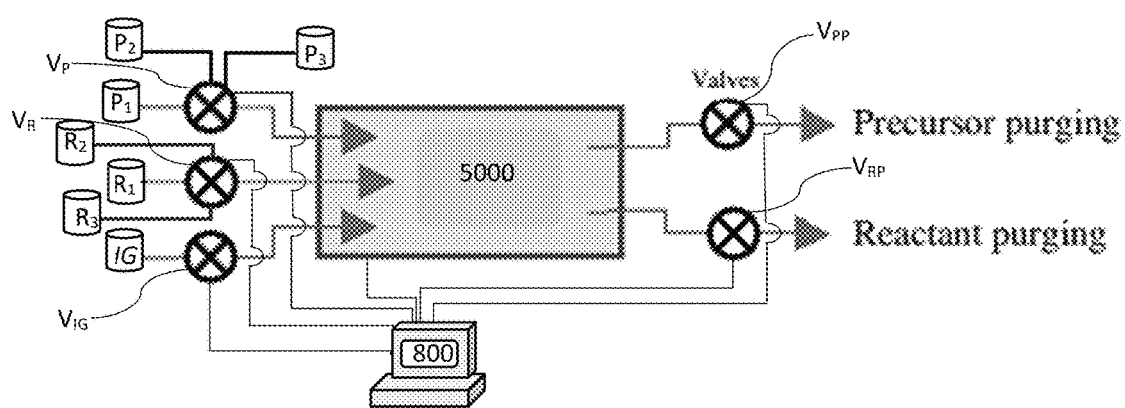
FIG. 4, is a schematic illustrating an exemplary implementation of the system, including selectable multi-precursor delivery, as well as selectable multi-reactant delivery systems.

Turning now to FIG. 4, illustrating a schematic of the systems disclosed. As illustrated, precursor port 201 is in liquid communication with plurality of selectable precursor reservoirs (P1, P2, P3) via valve V$_P$, while reactant port 203 is in liquid communication with a plurality of selectable reactant reservoirs (R1, R2, R3), via valve V$_R$, and inert gas port 205, via valve V$_{IG}$. Likewise vacuum, or purge ports 202, and 204 are in liquid communication with a corresponding vacuum source (so as not co-mingle precursors and reactant thus clogging the various conduits), via corresponding purge valves V$_{PP}$ and V$_{RP}$. As further illustrated, the system further comprises a central control module (CCM) 800, in communication with each of the plurality of plurality of selectable precursor reservoirs (P1, P2, P3), plurality of selectable reactant reservoirs (R1, R2, R3), each of V$_P$, V$_R$, V$_{IG}$, V$_{PP}$, V$_{RP}$, and the various pumps (vacuum, positive displacement, duplex, triplex, peristaltic, and the like), as well as heating elements in communication with the various reservoirs, operable to deliver the various precursors and reactants into reaction chamber 5000 as either liquid, gas or vapor. CCM 800, can be in further communication with substrate 500, operable to control the temperature of substrate 500 via heating elements, chuck and the like. CCM 800 is in further communication with at least one processor, the processor being in communication with a non-transitory storage device, storing thereon a computer-readable medium with a set of executable instructions, configured when executed by the at least one processor to perform the steps of the methods disclosed herein.

Figure 5A:
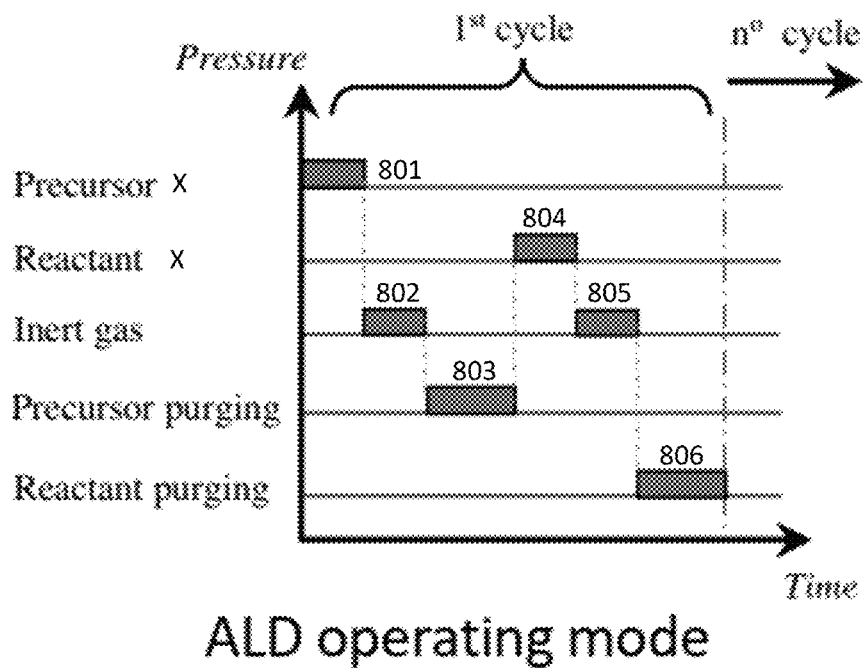
FIG. 5A, illustrates a first exemplary implementation of ALD operation, with FIG. 5B illustrating an exemplary implementation of CVD operation.
Figure 5B:
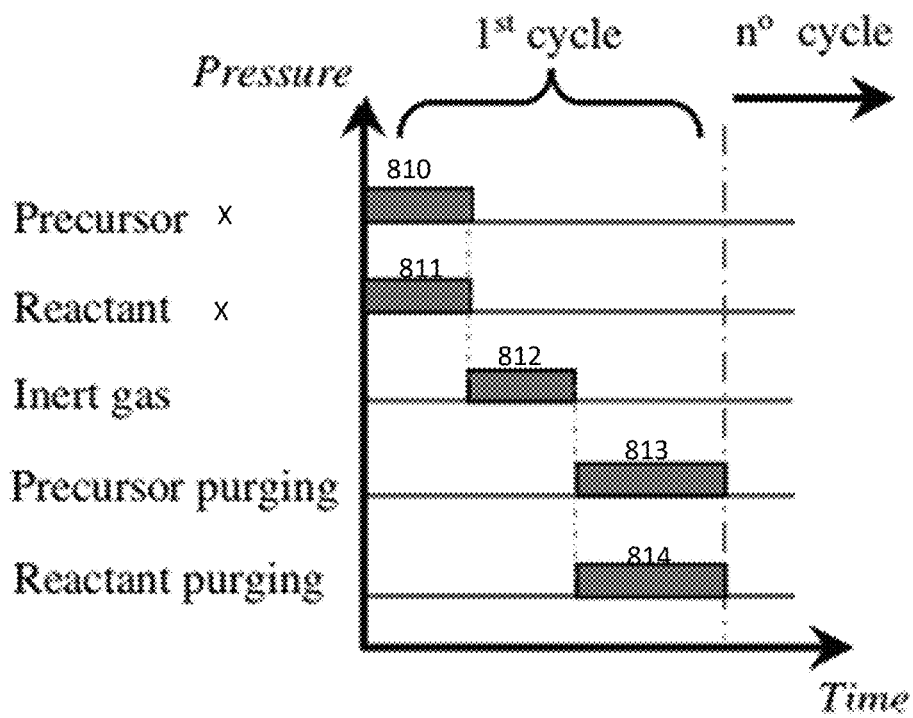
FIG. 5C, illustrates a first exemplary implementation of SIS operation.

Accordingly, and in an exemplary implementation, illustrated in FIG. 5A, provided herein is a method of performing a multi-layered material (film) using ALD, implemented using the multifunctional nozzle disclosed herein, the method comprising: Coupling the multifunctional (or multi-purpose) nozzle to a substrate (see e.g., FIG. 6) forming (hermetically) sealed reaction chamber 5000; Using the precursor port 201, contacting 801 the reaction chamber with the precursor in a gaseous state, or vapor for a predetermined period, wherein the precursor is configured to adhere to the substrate (which was optionally treated previously), forming a first precursor layer; then, using the inert gas port 205, flushing 802 the reaction chamber 5000; and using the first exhaust port, or the first vacuum port, purging 803 the reaction chamber 5000 from excess precursor. Then, using the reactant port, contacting 804 the reaction chamber 5000 with the reactant (again, in a gaseous state, or as a vapor), for a predetermined period, wherein the reactant is configured to react with the first precursor layer, forming a first reaction layer. Again, using the inert gas port 205, flushing 805 the reaction chamber 5000, and using the second exhaust port, or the second vacuum port 204, purging 806 the reaction chamber 5000 from excess reactant. The cycle can be repeated by optionally repeating the steps from the step of contacting the reaction chamber with the precursor 801, to the step of purging 806 the reaction chamber 5000 from excess reactant; and decoupling the substrate 500 from the multifunctional (or multi-purpose) nozzle 10. Coupling of substrate 500 (e.g., a wafer) to multifunctional (or multi-purpose) nozzle 10, can be either done with clamp (see e.g., 400, FIG. 6), optionally in the presence of O-ring disposed in channel 113, or using third vacuum port 210 (See e.g., FIG. 1B). Note that the listed ports and valves can be interchangeable in terms of usage reactant/Vacuum/precursor/. In fact, reactant, vacuum, precursor and inert gas can be set to flow in any of the listed above conduits. Additionally the size and shape of the nozzle's communication ports can be modified. These ports can be combined, forming either a cylindrical configuration or assembled to create a segmented arc, allowing for enhanced versatility in their functionality.

In another exemplary implementation, provided herein is a method of performing a multi-layered material using CVD, implemented using the multifunctional (or multi-purpose) nozzle 10 disclosed herein, the method comprising: coupling the multifunctional (or multi-purpose) nozzle 10 to a substrate 500 forming a (hermetically) sealed reaction chamber 5000; then, using the precursor port 201, contacting 810 the reaction chamber 5000 with the precursor in a gaseous, or vapor states, for a predetermined period, wherein the precursor is configured to adhere to the substrate, while simultaneously using the reactant port 203, contacting 811 the sealed reaction chamber 5000 with the reactant in a gaseous, or vapor state—for the same predetermined period, wherein the reactant is configured to react with the precursor, adhering to the substrate 500 and forming a first reaction layer. Then, using the inert gas port 205, flushing 812 the reaction chamber 5000, and using the first exhaust port, or the first vacuum port 202, purging 813 the reaction chamber 5000 from excess precursor, as well as using the second exhaust port, or the second vacuum port 204, simultaneously with the step of purging 813 the reaction chamber from excess precursor-purging 814 the reaction chamber 5000 from excess reactant. Here too, optionally repeating the steps from the step of contacting the reaction chamber with the precursor 810, to the step of purging the reaction chamber from excess reactant 814; and decoupling the substrate 500 from the multifunctional (or multi-purpose) nozzle. In certain exemplary implementations, the step of coupling the nozzle to a substrate forming a sealed reaction chamber is preceded by a step of heating the substrate to a predetermined temperature, followed by a step of flushing the reaction chamber with the inert gas for a predetermined period.

Figure 5C:
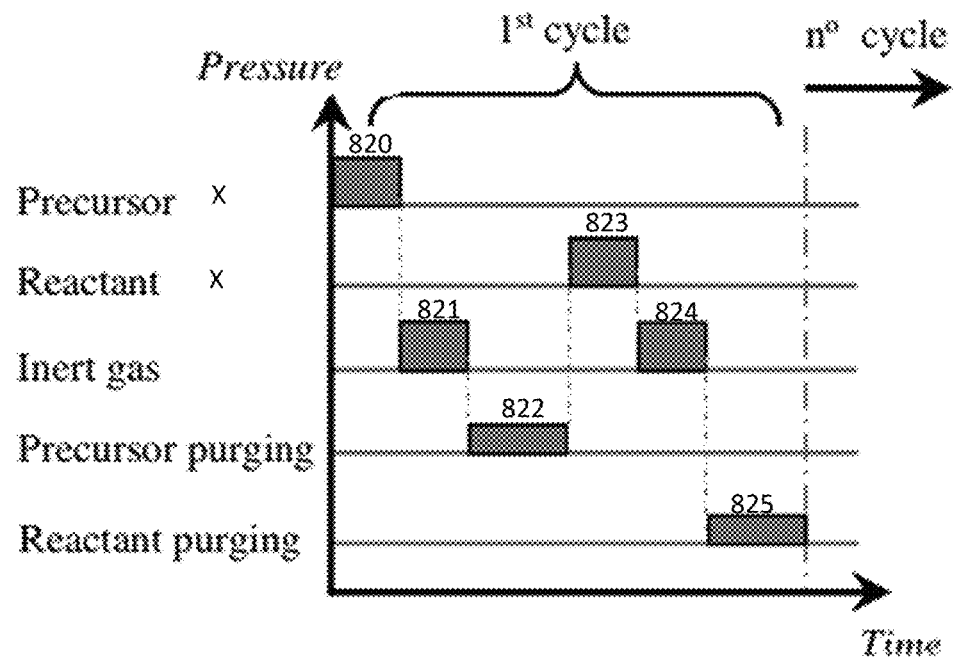

In yet another exemplary implementation, provided herein is a method of performing a multi-layered material using SIS, implemented using the multifunctional (or multipurpose) nozzle 10 disclosed herein (see e.g., FIG. 5C), the method comprising: coupling the multifunctional (or multipurpose) nozzle 10 to a substrate 500 forming a hermetically sealed reaction chamber 5000. Then, using the precursor port 201, contacting 820 the reaction chamber 5000 with the precursor in a liquid, or vapor state for a predetermined period, wherein the precursor is configured to adhere to nanostructures, or other films on the substrate (for example, films and features formed in the ALD method), forming a first precursor (mono, or sub-mono) layer, followed by using the inert gas port 205, flushing 821 the reaction chamber 5000, and using the first exhaust port, or the first vacuum port 202, purging 822 the reaction chamber 5000 from excess precursor. Then, using the reactant port 203, contacting 823 the reaction chamber 5000 with the reactant in a liquid, or vapor state, for a predetermined period, wherein the reactant is configured to react with the first precursor layer, forming a first reaction layer. Here too, using the inert gas port 205, flushing 824 the reaction chamber, followed by purging 825 the reaction chamber from excess reactant using the second exhaust port, or the second vacuum port 204. Optionally repeating the steps from the step of contacting 820 the reaction chamber with the precursor, to the step of purging 825 the reaction chamber from excess reactant; and decoupling the substrate 500 from the multifunctional (or multi-purpose) nozzle 10

Furthermore, the step of contacting 820 the reaction chamber with the precursor liquid or vapor, is preceded by a step of flushing the reaction chamber with the inert gas for a predetermined period using the inert gas port 205.

In an exemplary implementation, the precursor, or reactant used in the ALD, CVD, or SIS film forming methods disclosed can be, for example, at least one of: Trimethyl-aluminum (TMA), Tetrakis(dimethylamino) titanium (TD-MAT), Bis(cyclopentadienyl)zirconium (IV) dichloride (Cp2ZrC12), Tetrakis(ethylmethylamino)hafnium (TEMAH), and Bis(ethylcyclopentadienyl) ruthenium (II) (Ru(EtCp)2), Titanium tetrachloride (TiCl4), Tungsten hexafluoride (WF6), Hafnium tetrachloride (HfCl4), Ruthenium trichloride (RuCl3), and Molybdenum hexacarbonyl (Mo(CO)6), Diethyl zinc (DEZ), Dimethylamino magnesium (DMAMg), Bis(cyclopentadienyl) iron (II) (Cp2Fe), Triisobutylaluminum (TIBA), Tetrakis(trimethylsilyl) hafnium (TTHf), Aluminum isopropoxide (Al(O-iPr)3), Titanium isopropoxide (Ti(O-iPr)4), Zirconium n-propoxide (Zr(O-nPr)4), Hafnium ethoxide (Hf(OEt)4), Tantalum ethoxide (Ta(OEt)5), Bis(t-butylamino) silane (BTBAS), Bis(t-butylamino) zinc (BTBAS2), Bis(t-butylamino) titanium (BTBAT), Bis(t-butylamino) zirconium (BTBZ), Bis (t-butylamino) hafnium (BTBAH), Dimethylcyclopentadienyl platinum (MeCpPtMe3), Bis(methylcyclopentadienyl) nickel (Ni(MeCp)2), Cyclopentadienyltungsten tricarbonyl (CpW(CO)3), Dimethylcyclopentadienyl manganese tricarbonyl (MeCpMn(CO)3), and Iron pentacarbonyl (Fe(CO)5).

In another exemplary implementation, the inert gas can be at least one of: Nitrogen, Argon, Helium, and Neon. It is noted that the choice of inert gas depends on factors such as process requirements, film properties, equipment capabilities, and cost considerations. Additionally, specific applications or variations within ALD and CVD, or SIS techniques may call for the use of other inert gases or gas mixtures.

Surface treatment of the substrate used in the methods described herein can be at least one of: solvent (e.g., acetone, isopropyl alcohol (IPA), or ultrasonic cleaning to remove organic contaminants and particles) or acid (e.g., sulfuric acid ($H_2SO_4$) or hydrochloric acid (HCl)), cleaning; plasma (e.g., using reactive gases like oxygen (O2), hydrogen (H2), or fluorine-based gases ($CF_4$, $SF_6$), is done to remove native oxide layers or to pattern the substrate surface), and/or wet (e.g., to remove unwanted layers or roughen the surface for improved film adhesion for example, for SIS) etching; and surface functionalization (e.g., silane coupling agents, such as APTES (aminopropyltriethoxysilane) or HMDS (hexamethyldisilazane), by introducing specific chemical groups that enhance film bonding or modify surface energy).

Accordingly and in an exemplary implementation, provided herein is a multifunctional nozzle operable for Atomic Layer Deposition (ALD), Chemical Vapor Deposition (CVD), and Sequential Infiltration Synthesis (SIS), the nozzle comprising: an upper housing portion having an apical side and a basal side: a lower housing portion, extending basally from basal side of the upper portion, the lower housing portion having a basal surface, wherein the basal potion defining a peripheral wall having a predetermined perimeter cross section extending basally beyond the basal surface: a precursor inlet port, the precursor inlet port being in fluid communication with: a precursor reservoir containing a precursor; and the basal surface of the lower housing portion; a first exhaust port, or a first vacuum port, the first vacuum port being in fluid communication with: a first vacuum source; and the basal surface of the lower housing portion a reactant inlet port, the reactant inlet port being in fluid communication with: a reactant reservoir containing a reactant; and the basal surface of the lower housing portion; a second exhaust port, or a second vacuum port, the second vacuum port being in fluid communication with: a second vacuum source; and the basal surface of the lower housing portion; and an inert gas inlet port, the inert gas inlet port being in fluid communication with: an inert gas reservoir; and the basal surface of the lower housing portion, further comprising (i) a third vacuum port, the third vacuum port being in fluid communication with: a third vacuum source; and the channel formed in-between the internal lip and the external lip, (ii) operable to engage a substrate, wherein (iii) the precursor inlet port is in fluid communication with the basal surface of the lower housing portion via a plurality of ducts branching basally from an aperture defined in the precursor inlet port, each duct terminating in a corresponding precursor outlet opening—defined in the basal surface of the lower housing, wherein (iv) the first exhaust port, or the first vacuum port is in fluid communication with the basal surface of the lower housing portion via: a first exhaust tube, or a first vacuum tube extending basally from an aperture defined in the first exhaust port, or the first vacuum port: a first annular manifold, in fluid communication with the first exhaust tube, or the first vacuum tube; and a plurality of ducts extending basally from the first annular manifold, each of the plurality of ducts terminating in a corresponding opening—defined in the basal surface of the lower housing portion, wherein (v) the reactant port is in fluid communication with the basal surface of the lower housing portion via: a reactant tube extending basally from an aperture defined in the reactant port: a reactant annular manifold, in fluid communication with the reactant tube; and a plurality of ducts extending basally from the reactant annular manifold, each of the plurality of ducts terminating in a corresponding opening—defined in the basal surface of the lower housing portion. (vi) the second exhaust port, or the second vacuum port is in fluid communication with the basal surface of the lower housing portion via: a second exhaust tube, or a second vacuum tube extending basally from an aperture defined in the second exhaust port, or the second vacuum port: a second annular manifold, in fluid communication with the second exhaust tube, or the second vacuum tube; and a plurality of ducts extending basally from the second annular manifold, each of the plurality of ducts terminating in a corresponding opening—defined in the basal surface of the lower housing portion, wherein (vii) the inert gas port is in fluid communication with the basal surface of the lower housing portion via: an inert gas tube extending basally from an aperture defined in the inert gas port: an inert gas annular manifold, in fluid communication with the inert gas tube; and a plurality of ducts extending basally from the inert gas annular manifold, each of the plurality of ducts terminating in a corresponding opening—defined in the basal surface of the lower housing portion, (viii) the aperture defined in the precursor inlet port, the first annular manifold, the reactant annular manifold, the second annular manifold, and the inert gas manifold are all co-axial to each other, wherein (ix) the third vacuum port is in fluid communication with the channel formed in-between the internal lip and the external lip via: a third vacuum tube extending basally from an aperture defined in the third vacuum port; a third annular manifold, in fluid communication with the third vacuum tube; and a plurality of ducts extending basally from the third annular manifold, each of the plurality of ducts terminating in a corresponding opening—defined apically in the channel formed in-between the internal lip and the external lip. (x) the first annular port is in the upper housing portion of the nozzle, wherein (xi) the reactant annular manifold, the second annular manifold, and the inert gas manifold are all in the lower housing portion, (xii) the aperture defined in the precursor inlet port, the first annular manifold, the reactant annular manifold, the second annular manifold, and the inert gas manifold are axially separated (in other words, NOT coaxial), wherein (xiii) the precursor port is in fluid communication with a plurality of selectable precursors reservoirs (in other words, through e.g., selection valves and check-valves that allow selecting precursor reservoirs without affecting the operation of other components in the system (e.g., inert gasses and reactants), and similarly (xiv) the reactant port is in fluid communication with a plurality of selectable reactant reservoirs.

In another exemplary implementation, provided herein is a method of performing a multi-layered material using ALD, implemented using the nozzles disclosed and described herein and in the figures provided, the method comprising: Coupling the nozzle to a substrate forming a sealed reaction chamber; Using the precursor port, contacting the reaction chamber with the precursor in a gaseous state, or vapor for a predetermined period, wherein the precursor is configured to adhere to the substrate, forming a first precursor layer; Using the inert gas port, flushing the reaction chamber; Using the first exhaust port, or the first vacuum port, purging the reaction chamber from excess precursor; Using the reactant port, contacting the reaction chamber with the reactant in a gaseous state, or vapor, for a predetermined period, wherein the reactant is configured to react with the first precursor layer, forming a first reaction layer; Using the inert gas port, flushing the reaction chamber; Using the second exhaust port, or the second vacuum port, purging the reaction chamber from excess reactant; optionally repeating the steps from the step of contacting the reaction chamber with the precursor, to the step of purging the reaction chamber from excess reactant; and decoupling the substrate from the nozzle, wherein (xv) the substrate is a wafer, or a wafer on a substrate.

In yet another exemplary implementation, provided herein is a method of performing a multi-layered material using CVD, implemented using the nozzles disclosed and described herein and in the figures provided, the method comprising: Coupling the nozzle to a substrate forming a sealed reaction chamber; Using the precursor port, contacting the reaction chamber with the precursor in a gaseous state, or vapor, for a predetermined period; Using the reactant port, simultaneously with the step of contacting the reaction chamber with the precursor, contacting the reaction chamber with the reactant in a gaseous state, or vapor, for the same predetermined period, wherein the reactant is configured to react with the precursor, adhering to the substrate and forming a first reaction layer; Using the inert gas port, flushing the reaction chamber; Using the first exhaust port, or the first vacuum port, purging the reaction chamber from excess precursor; Using the second exhaust port, or the second vacuum port, simultaneously with the step of purging the reaction chamber from excess precursor-purging the reaction chamber from excess reactant; optionally repeating the steps from the step of contacting the reaction chamber with the precursor, to the step of purging the reaction chamber from excess reactant; and decoupling the substrate from the nozzle, wherein (xvi) the substrate is a wafer, or a wafer disposed on a substrate, and wherein (xvii) the step of coupling the nozzle to a substrate forming a sealed reaction chamber is preceded by a step of heating the substrate to a predetermined temperature, and wherein (xviii) the steps of simultaneously contacting the reaction chamber with the precursor and the reactant, is preceded by a step of flushing the reaction chamber with the inert gas for a predetermined period.

In an exemplary implementation, provided herein is a method of performing a multi-layered material using SIS, implemented using the nozzles disclosed and described herein and in the figures provided, the method comprising: coupling the nozzle to a substrate forming a sealed reaction chamber; using the precursor port, contacting the reaction chamber with the precursor in a liquid state, or vapor for a predetermined period, wherein the precursor is configured to adhere to the substrate, forming a first precursor layer; using the inert gas port, flushing the reaction chamber; using the first exhaust port, or the first vacuum port, purging the reaction chamber from excess precursor; using the reactant port, contacting the reaction chamber with the reactant in a liquid state, or vapor, for a predetermined period, wherein the reactant is configured to react with the first precursor layer, forming a first reaction layer; using the inert gas port, flushing the reaction chamber; using the second exhaust port, or the second vacuum port, purging the reaction chamber from excess reactant; optionally repeating the steps from the step of contacting the reaction chamber with the precursor, to the step of purging the reaction chamber from excess reactant; and decoupling the substrate from the nozzle, wherein (xix) an upper surface of the substrate comprises nanostructures or deposited films (in other words, either protruding from, or nanoscale slits and traces), and wherein (xx) the step of contacting the reaction chamber with the precursor liquid or vapor, is preceded by a step of flushing the reaction chamber with the inert gas for a predetermined period.

While in the foregoing specification the devices, systems and methods for forming multi-layered film using a multifunctional (multi-purpose) nozzle, enabling materials deposition using ALD, CVD, and SIS, have been described in relation to certain preferred exemplary implementations, and many details are set forth for purpose of illustration, it will be apparent to those skilled in the art that the disclosure of the systems and methods allowing CIP of print heads is susceptible to additional exemplary implementations and that certain of the details described in this specification and as are more fully delineated in the following claims can be varied considerably without departing from the basic principles of this disclosure.

What is claimed is:

1. A multifunctional nozzle operable for Atomic Layer Deposition (ALD), Chemical Vapor Deposition (CVD), and Sequential Infiltration Synthesis (SIS), the nozzle comprising:
   a) an upper housing portion having an apical side and a basal side;
   b) a lower housing portion, extending basally from basal side of the upper portion, the lower housing portion having a basal surface, wherein the basal-lower housing potion defining a peripheral wall having a predetermined perimeter cross section extending basally beyond the basal surface;
   c) a precursor inlet port, the precursor inlet port being in fluid communication with:
      i. a precursor reservoir containing a precursor; and
      ii. the basal surface of the lower housing portion;
   d) a first exhaust port, or a first vacuum port, the first vacuum port being in fluid communication with:
      i. a first vacuum source; and
      ii. the basal surface of the lower housing portion
   e) a reactant inlet port, the reactant inlet port being in fluid communication with:
      i. a reactant reservoir containing a reactant; and
      ii. the basal surface of the lower housing portion;
   f) a second exhaust port, or a second vacuum port, the second vacuum port being in fluid communication with:
      i. a second vacuum source; and
      ii. the basal surface of the lower housing portion; and
   g) an inert gas inlet port, the inert gas inlet port being in fluid communication with:
      i. an inert gas reservoir; and
      ii. the basal surface of the lower housing portion.

2. The nozzle of claim 1, further comprising a third vacuum port, the third vacuum port being in fluid communication with:
   a) a third vacuum source; and
   b) a channel formed in-between an internal lip and an external lip.

3. The nozzle of claim 1, operable to engage a substrate.

4. The nozzle of claim 1, wherein the precursor inlet port is in fluid communication with the basal surface of the lower housing portion via a plurality of ducts branching basally from an aperture defined in the precursor inlet port, each duct terminating in a corresponding precursor outlet opening—defined in the basal surface of the lower housing.

5. The nozzle of claim 1, wherein the first exhaust port, or the first vacuum port is in fluid communication with the basal surface of the lower housing portion via:
   a) a first exhaust tube, or a first vacuum tube extending basally from an aperture defined in the first exhaust port, or the first vacuum port;
   b) a first annular manifold, in fluid communication with the first exhaust tube, or the first vacuum tube; and
   c) a plurality of ducts extending basally from the first annular manifold, each of the plurality of ducts terminating in a corresponding opening—defined in the basal surface of the lower housing portion.

6. The nozzle of claim 5, wherein the reactant port is in fluid communication with the basal surface of the lower housing portion via:
   a) a reactant tube extending basally from an aperture defined in the reactant port;
   b) a reactant annular manifold, in fluid communication with the reactant tube; and
   c) a plurality of ducts extending basally from the reactant annular manifold, each of the plurality of ducts terminating in a corresponding opening—defined in the basal surface of the lower housing portion.

7. The nozzle of claim 6, wherein the second exhaust port, or the second vacuum port is in fluid communication with the basal surface of the lower housing portion via:
   a) a second exhaust tube, or a second vacuum tube extending basally from an aperture defined in the second exhaust port, or the second vacuum port;
   b) a second annular manifold, in fluid communication with the second exhaust tube, or the second vacuum tube; and
   c) a plurality of ducts extending basally from the second annular manifold, each of the plurality of ducts terminating in a corresponding opening—defined in the basal surface of the lower housing portion.

8. The nozzle of claim 7, wherein the inert gas port is in fluid communication with the basal surface of the lower housing portion via:
   a) an inert gas tube extending basally from an aperture defined in the inert gas port;
   b) an inert gas annular manifold, in fluid communication with the inert gas tube; and
   c) a plurality of ducts extending basally from the inert gas annular manifold, each of the plurality of ducts terminating in a corresponding opening—defined in the basal surface of the lower housing portion.

9. The nozzle of claim 8, wherein the aperture defined in the precursor inlet port, the first annular manifold, the reactant annular manifold, the second annular manifold, and the inert gas manifold are co-axial.

10. The nozzle of claim 2, wherein the third vacuum port is in fluid communication with the channel formed in-between the internal lip and the external lip via:
    a) a third vacuum tube extending basally from an aperture defined in the third vacuum port;
    b) a third annular manifold, in fluid communication with the third vacuum tube; and
    c) a plurality of ducts extending basally from the third annular manifold, each of the plurality of ducts terminating in a corresponding opening—defined apically in the channel formed in-between the internal lip and the external lip.

11. The nozzle of claim 8, wherein the first annular manifold is in the upper housing portion of the nozzle.

12. The nozzle of claim 11, wherein the reactant annular manifold, the second annular manifold, and the inert gas manifold are in the lower housing portion.

13. The nozzle of claim 9, wherein the aperture defined in the precursor inlet port, the first annular manifold, the reactant annular manifold, the second annular manifold, and the inert gas manifold are axially separated.

14. The nozzle of claim 1, wherein the precursor port is in fluid communication with a plurality of selectable precursor reservoirs.

15. The nozzle of claim 1, wherein the reactant port is in fluid communication with a plurality of selectable reactant reservoirs.

16. A method of performing a multi-layered material using ALD, implemented using the nozzle of claim 1, the method comprising:
 a) Coupling the nozzle to a substrate forming a sealed reaction chamber;
 b) Using the precursor port, contacting the reaction chamber with the precursor in a gaseous state, or vapor for a predetermined period, wherein the precursor is configured to adhere to the substrate, forming a first precursor layer;
 c) Using the inert gas port, flushing the reaction chamber;
 d) Using the first exhaust port, or the first vacuum port, purging the reaction chamber from excess precursor;
 e) Using the reactant port, contacting the reaction chamber with the reactant in a gaseous state, or vapor, for a predetermined period, wherein the reactant is configured to react with the first precursor layer, forming a first reaction layer;
 f) Using the inert gas port, flushing the reaction chamber;
 g) Using the second exhaust port, or the second vacuum port, purging the reaction chamber from excess reactant;
 h) optionally repeating the steps from the step of contacting the reaction chamber with the precursor, to the step of purging the reaction chamber from excess reactant; and
 i) decoupling the substrate from the nozzle.

17. The method of claim 16, wherein the substrate is a wafer.

18. A method of performing a multi-layered material using CVD, implemented using the nozzle of claim 1, the method comprising:
 a) Coupling the nozzle to a substrate forming a sealed reaction chamber;
 b) Using the precursor port, contacting the reaction chamber with the precursor in a gaseous state, or vapor, for a predetermined period;
 c) Using the reactant port, simultaneously with the step of contacting the reaction chamber with the precursor, contacting the reaction chamber with the reactant in a gaseous state, or vapor, for the same predetermined period, wherein the reactant is configured to react with the precursor, adhering to the substrate and forming a first reaction layer;
 d) Using the inert gas port, flushing the reaction chamber;
 e) Using the first exhaust port, or the first vacuum port, purging the reaction chamber from excess precursor;
 f) Using the second exhaust port, or the second vacuum port, simultaneously with the step of purging the reaction chamber from excess precursor-purging the reaction chamber from excess reactant;
 g) optionally repeating the steps from the step of contacting the reaction chamber with the precursor, to the step of purging the reaction chamber from excess reactant; and
 h) decoupling the substrate from the nozzle.

19. The method of claim 18, wherein the substrate is a wafer.

20. The method of claim 18, wherein the step of coupling the nozzle to a substrate forming a sealed reaction chamber is preceded by a step of heating the substrate to a predetermined temperature.

21. The method of claim 18, wherein the steps of simultaneously contacting the reaction chamber with the precursor and the reactant, is preceded by a step of flushing the reaction chamber with the inert gas for a predetermined period.

22. A method of performing a multi-layered material using SIS, implemented using the nozzle of claim 1, the method comprising:
 a) Coupling the nozzle to a substrate forming a sealed reaction chamber;
 b) Using the precursor port, contacting the reaction chamber with the precursor in a liquid state, or vapor for a predetermined period, wherein the precursor is configured to adhere to the substrate, forming a first precursor layer;
 c) Using the inert gas port, flushing the reaction chamber;
 d) Using the first exhaust port, or the first vacuum port, purging the reaction chamber from excess precursor;
 e) Using the reactant port, contacting the reaction chamber with the reactant in a liquid state, or vapor, for a predetermined period, wherein the reactant is configured to react with the first precursor layer, forming a first reaction layer;
 f) Using the inert gas port, flushing the reaction chamber;
 g) Using the second exhaust port, or the second vacuum port, purging the reaction chamber from excess reactant;
 h) optionally repeating the steps from the step of contacting the reaction chamber with the precursor, to the step of purging the reaction chamber from excess reactant; and
 i) decoupling the substrate from the nozzle.

23. The method of claim 22, wherein an upper surface of the substrate comprises nanostructures or deposited films.

24. The method of claim 23, wherein the step of contacting the reaction chamber with the precursor liquid or vapor, is preceded by a step of flushing the reaction chamber with the inert gas for a predetermined period.

* * * * *